United States Patent Office 2,950,330
Patented Aug. 23, 1960

2,950,330
1,3-DICHLOROPROPYNE

William E. Duggins, Berkley Heights, N.J., assignor to General Aniline & Film Corporation, New York, N.Y., a corporation of Delaware No Drawing. Filed Jan. 31, 1958, Ser. No. 712,292

1 Claim. (Cl. 260—654)

The present invention relates to 1,3-dichloropropyne and to a process for preparing the same.

The preparation of 1-bromo-3-chloro-1-propyne and 1,3-dibromopropyne by reacting a cold alkaline solution containing hypobromite ion with propargyl chloride and propargyl bromide, respectively, has been reported by Hatch and Kidwell, J. Am. Chem Soc., v. 76, pp. 289–90, 1954. Hatch and Kidwell stated that attempts to react hypochlorite ion with propargyl chloride and propargyl bromide were unsuccessful.

It is an object of the present invention to provide a method for preparing 1,3-dichloropropyne which is useful as a soil fumigant.

Other objects and advantages will appear from the following description.

I have found that 1,3-dichloropropyne is readily prepared by reacting one mole of propargyl chloride with an aqueous solution containing one to three moles of sodium hypochlorite. The use of one mole of sodium hypochlorite gives the desired product. However, when larger amounts ranging from one to three moles of sodium hypochlorite are used, the yield is somewhat higher. An aqueous solution of sodium hypochlorite is commonly prepared by passing chlorine into an aqueous solution of sodium hydroxide. The reaction mixture is stirred at 5° C. to room temperature for a period of two to six hours. If desired, the product can be separated from the reaction mixture by extraction with a suitable solvent such as diethyl ether. In this case the 1,3-dichloropropyne is isolated by distilling the solvent. The product can, of course, be further purified by the usual techniques such as distillation.

The following example will clearly illustrate in greater detail the exact procedural steps that are employed in preparing the 1,3-dichloropropyne.

Example

A 2-liter flask fitted with an agitator and thermometer was charged with 700 grams of an aqueous solution containing 37.0 grams (0.496 mole) of sodium hypochlorite. This solution was cooled to 5 to 10° C. and 37 grams (0.496 mole) of propargyl chloride added over a period of two hours. The reaction mixture was stirred for three hours and then extracted with diethyl ether. After separation of the ethereal layer, the product was isolated by distilling off the solvent. The resulting 1,3-dichloropropyne was not spontaneously flammable in air.

*Analysis.*—Calc.: Cl, 65.1. Found: Cl, 63.5.

I claim:

The process of preparing 1,3-dichloropropyne which comprises treating one mole of propargyl chloride with an aqueous solution containing one to three moles of sodium hypochlorite for a period of time sufficient to yield the said 1,3-dichloropropyne.

References Cited in the file of this patent

UNITED STATES PATENTS 2,749,377     Johnston _____ June 5, 1956

OTHER REFERENCES

Hatch et al.: Jour. Am. Chem. Soc., vol. 76, pages 289 and 290 (1954).